Dec. 3, 1963 C. B. CRAWFORD 3,112,940
TUBE COUPLING
Filed March 17, 1960
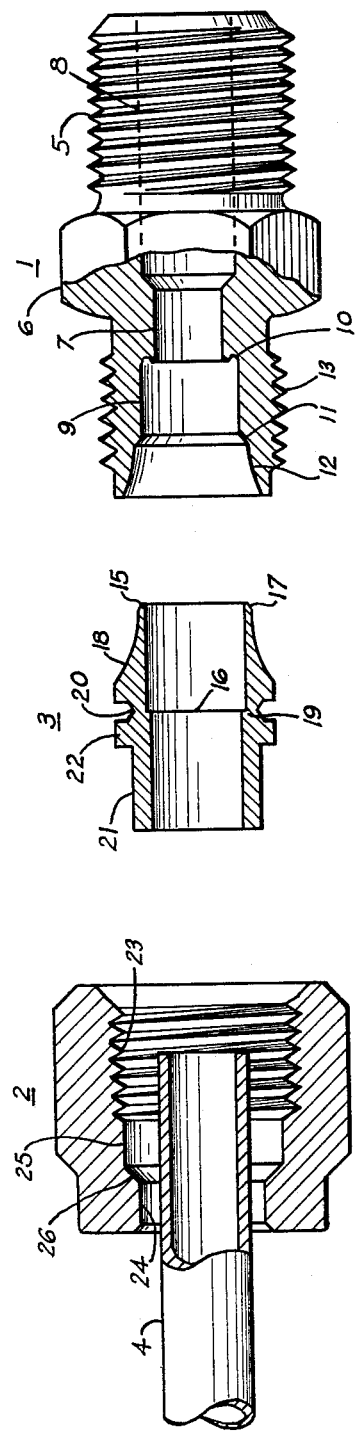
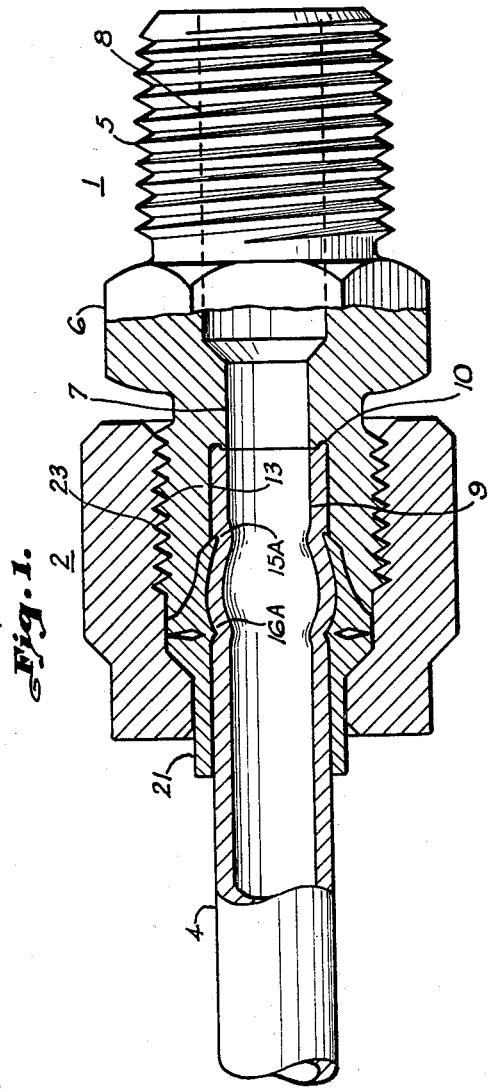
INVENTOR.
CULLEN B. CRAWFORD
BY *Arthur L. Wade*
ATTORNEY

United States Patent Office 3,112,940
Patented Dec. 3, 1963

3,112,940
TUBE COUPLING
Cullen B. Crawford, Cleveland, Ohio
(25700 Lakeland Blvd., Euclid 32, Ohio)
Filed Mar. 17, 1960, Ser. No. 15,565
6 Claims. (Cl. 285—341)

This invention relates to flareless tube couplings employing a single collet member. The single collet is deformed between a nut member and a body member in developing the retaining structure between the tube wall and collet at a plurality of locations along the tube length.

Present tube coupling structures have been developed in varied forms. The variety in the forms has been stimulated by both the number of different materials available for both couplings and tubes and the many kinds of conditions of service demanded of the couplings.

Tubes are coupled to other tubes, or containers for the fluid transmitted by the tubes. Obviously, the couplings should function efficiently, although frequently connected and disconnected. The couplings should generally give a minimum deformation to the tube in order to offer as little restriction as possible to flow of fluid through the tube. Further, the couplings should function efficiently as sealing and joining structures under the expected variable conditions of vibration, pressure and temperature. Finally, the couplings should effectively resist any chemical characteristics of the fluid conducted through the tube which tend to reduce its efficiency to seal and retain the fluids.

Couplings of the type employing one or more collet members between a nut and body have used a collet edge, directed toward the tube surface, to throw up a chip of tube material in gripping the tube to retain the tube in the coupling and while sealing the coupling to the tube. However, when collet edges throw up chips by their continuous direction toward the axis of the tube, the grain structure of the tube wall will split continuously toward the tube axis under the vibration of normal service or when the coupling is overtightened. The result is failure of the tube wall, along with the sealing and retaining function. Dividing this chipping type of holding and sealing function along the tube wall into a series of such chipping actions has not eliminated this basic problem.

Swaging the tube, by deforming coupling members into the tube wall, has been employed as an alternate to, and in combination with, the chipping action. However, swaging will reduce a tube diameter below satisfactory limits. Also, holding a tube by a coupling which swages the tube will generally produce a relatively weak union from which the tube will slip under the large pressures of many modern applications.

There is a fortunate compromise between chipping toward the tube axis and swaging. This compromise is brought about by what is termed skiving, or scraping, material from the tube surface to develop the material into the form of an abutment. The action is obtained by the use of a sharp edge of a collet as is employed in chipping. However, the driving surface of the nut, or body, deforming the sharp edge of the collet into the tube is caused to impart a relatively long, longitudinal, travel to the sharp edge after a limited cutting action into the tube surface.

The edge with which the skiving, or scraping, action is obtained can be shuttled toward the longitudinal direction of movement to avoid the undesirable continuous cutting toward the tube axis. The result sought by this shuttling action is to bring a flat surface adjacent the sharp edge of the collet against the abutment of the tube material to give the sealing and holding functions.

Also, the edge with which the skiving, or scraping, action is obtained can be positively limited by surfaces of the coupling body on each side of the edge to avoid continuous cutting of the edge toward the tube axis. In effect, a body surface abuts a collet surface to prevent continual movement of the collet skiving edge in a longitudinal direction, relative to the body.

In generating the skiving action to develop a sealing and retaining abutment formation between the collet and tube, there are several basic problems overcome by the present invention. One problem results from driving a collet by a nut threadedly engaged with a body by a torque. As edges of prior collets engage the tube, the collets continue to turn under torque and transmit the torque on the nut to the tube. Another problem results from deforming a collet into a solid mass between the nut and body which mass permits no resiliency to forces applied to the tube in a direction to drive the tube from its coupling.

Still another problem is found in the expense and complication of obtaining the skiving-plural abutment function and retaining and sealing structure with more than one collet between a nut and body of a coupling. Another problem in moving a sharp collet edge to skive up an abutment from a tube surface lies in limiting the depth into the tube wall the sharp edge is moved to avoid failing the wall of the tube if the coupling is overtightened.

One object of the invention is to prevent transmission of torque from the rotated nut of a coupling to a tube as the nut and body are threadedly engaged to deform a collet between them to develop sealing and retaining structure between the collet and the tube.

Another object is to provide resilient retention of a coupled tube within a coupling.

Another object is to provide a simple, inexpensive, combination of nut, body and single collet which will produce plural abutments of tube material by a skiving action.

Another object is to move a sharp collet edge into a tube wall to skive up tube abutments and then provide surfaces on the collet and surfaces on the body which will limit the depth the edge is moved into the tube wall so the wall will not fail.

The present invention contemplates providing mating surfaces on the collet and body between which sufficient friction develops to prevent relative rotation of the collet and body and transmission of torque from the nut of the coupling to the tube.

The invention further contemplates a groove formed around the collet whose walls are partially collapsed between the nut and body as the collet is deformed to form an interstice which will permit a degree of resilient expansion and contraction between the coupling and the tube held in the coupling.

The invention further contemplates a coupling of only three pieces. A single collet member, deformed between a nut and body, will develop plural retention and sealing abutments of tube material by sharp edges of the collet moved into the tube surface in a skiving action. This coupling will result in a simple, three-piece, non-flared, premium, high-pressure, fitting which will compare with any other type, now available, on a commercial basis.

The present invention contemplates a tube coupling employing a collet having a leading sharp edge which is positively limited in its movement into the tube surface, by abutting surfaces of the collet and body, after the edge develops a sealing and retaining abutment from the material of the external wall of the tube.

The invention further contemplates the web of the coupling opposite the groove around the collet carrying a sharp edge which is driven, and directed, into the tube wall by the inwardly bowed web to develop a retaining and sealing abutment of the tube material. Further, the collet surfaces on each side of the sharp edge are kept in contact with the tube surface to control the depth the edge penetrates into the tube wall in order to prevent the edge from cutting deep enough into the tube wall to fail it.

Other objects and advantages of the present invention will become readily apparent from the following detailed descriptions of the invention with a specific reference to the accompanying drawing in which:

FIG. 1 is an exploded, partially sectioned, longitudinal elevation of the parts of a tube coupling embodying the present invention; and FIG. 2 is a partially sectioned elevation of the coupling parts made up on a tube to illustrate the position and final deformation of the coupling collet and tube.

Referring specifically to FIG. 1, there is shown, in an exploded, partially sectioned, longitudinal elevation, the various parts of the coupling in which the invention is embodied. The relative sizes, as between the parts, have been maintained for better understanding of the interrelated functions of the surfaces on the parts.

Body 1 and nut 2 are threadedly engaged to capture the single collet 3 between their surfaces to deform the coupling and develop the sealing and retaining structure. Tube 4 is illustrated, in FIG. 1, as inserted through the nut. In assembly of the coupling, tube 4 is extended through the bore of the nut, as well as the bore of the collet, and into the bore of the body until the inserted end of the tube is brought against an internal shoulder of the body. When the body and nut are then threadedly engaged, collet 3 is deformed by the surfaces of the nut and body, developing abutments as the sealing and retaining structure from the material of the tube wall. With the coupling surfaces and these abutments, the tube is sealed to the coupling and held in the coupling. FIG. 2 depicts the assembled, final, relationship between the coupling parts and the tube.

BODY 1

Body 1 is formed from a single piece of material, preferably metal. The body is adapted to be connected to a fluid receptacle not shown. For the union of body and receptacle, the body could have been flanged for bolting the two together. However, in FIG. 1, the body is illustrated as threaded at 5 for threaded engagement with the receptacle which is not illustrated. The conventional threaded engagement is accomplished by applying a hand tool to the surface 6 and manually rotating the body in the receptacle threads.

The smallest bore of the body, at 7, is sized to the diameter of which will match the inside diameter of tube 4. A counter bore 8 is drilled into the body from the right. Communication between the receptacle and the interior of tube 4 is through bores 7 and 8.

The various counter bores into body 1, from the left, are now considered as they develop the internal surfaces of body 1 against which collet 3 is deformed by nut 2. The first counter bore from the left forms a surface 9 which is simply a cylinder with a diameter equal to the outside diameter of tube 4. Counter bore 9 is, moreover, parallel with the axis of the body 1 and bore 7. Between surfaces 7 and 9, shoulder 10 is formed. Shoulder 10 abuts the end of tube 4 and, thereby, limits the movement of the tube 4 into body 1.

Shoulder 10 is illustrated as undercut to a degree. This undercut may be given any one of several specific forms. In general, the undercut is formed to capture the tube end positively. With the end of tube 4 nested in the undercut shoulder 10, and tube 4 extending a finite distance along the cylinder of bore 9, the tube end is held with stability and the tube sealed efficiently to the body 1.

The second counter bore in body 1 from the left forms shoulder 11. This shoulder is given the shape of a conical frustum, which flares out from the outer end of the cylindrical surface of counter bore 9.

The third, and final, counter bore of body 1 from the left leaves a surface flared to the external surface of body 1. More specifically, flared mouth 12 has a cross section which follows a predetermined radius. The result is a mouth surface which offers a relatively large abutting surface with which to match its complemental surface on the collet 3.

On the external surface of the left end of body 1, male threads 13 are formed. Threads 13 engage female threads of nut 2. When collet 3 is captured between nut 2 and the internal surfaces 9, 10, 11 and 12 of body 1, the collet is deformed and moved a finite distance to the right along the direction of the tube axis, by the nut 2, to develop the holding and sealing abutments of the tube material by a skiving action.

COLLET 3

Collet 3 is shaped to fit over tube 4 and deform between the surfaces of body 1 and nut 2 to develop two abutments of tube material with which the tube 4 is both held, and sealed, to the coupling of which the collet is a part. The leading edge of collet 3, at 15, develops the first abutment. An internal step at 16 forms the second abutment-developing edge. As collet 3 is deformed between the surfaces of body 1 and nut 2, these two sharp edges are carried into the material of the tube surface in a skiving action to develop the desired abutments.

The sharp leading edge 15 of collet 3 is formed by a beveled surface 17 on the front of the collet. This beveled surface 17 is engaged initially by the last portion of flared mouth 12 and then by shoulder surface 11, to be cammed inwardly, into the surface of tube 4.

A concave surface 18 is formed externally on collet 3, extending to the left from beveled surface 17. The cross-section of surface 18 equals the radius of the cross-section of surface 12. Therefore, as collet 3 is forced onto surfaces 12 and 11, leading edge 15 is cammed inwardly thereby until matching surfaces 12 and 18 engage each other.

As surfaces 12 and 18 engage over their comparatively large areas, the friction developed between them prevents their turning with respect to each other. Therefore, the torque applied to collet 3, by nut 2, is not transmitted to the tube coupled. No further skiving action between the sharp edges of collet 3 and the tube surface takes place after surfaces 12 and 18 have been brought together. Therefore, after the abutments of tube material have been formed ahead of the sharp collet edges, there is no possibility of progressive cutting action by the edges toward the tube axis which will contribute to eventual failure of the coupling similar to that experienced in prior art couplings.

The shape and size of the camming surface 11, together with the engagement of surfaces 12 and 18, limit in a very positive and definite manner the skiving action of the sharp edge 15 in forming its abutment of tube material. Also, the lateral dimension of the front portion of collet 3, and the lateral thickness of surface 11, set the extent of the penetration of edge 15 into the tube surface. The actual reduction to practice successfully employed a lateral dimension for the first portion of collet 3 approximately 10 percent greater than the lateral thickness of surface 11.

The limited penetration, together with the distance of longitudinal travel of edge 15, fixed by collet surface 17 and body surface 11 abutting each other, define the skiving action which produces the tube material abutment. Excessive torque applied to the coupling will fail to carry the abutment-forming action beyond the extent defined by these limits. Therefore, the tube wall will not fail from this action.

Sharp edge 16 is then applied to the tube 4 surface in a second abutment-forming skiving action. Sharp edge 16, formed by counter boring collet 3 from the right is located behind surface 18 as collet 3 is moved from left to right. This location of shoulder-edge 16 is vertically opposite a web 19.

Web 19 is formed as that part of the collet 3 body material that remains when a right-angle groove 20 is cut into the collet 3 body a finite distance to the left of surface 18. A second right-angle cut 21 is made into collet 3 a spaced distance to the left of groove 20, the width of the cut being the remaining length of collet 3 to the left. Groove 20 and cut 21 leave upstanding ridge, or protuberance, 22 on collet 3. This ring 22 is engaged by nut 2 when the collet is deformed in tightening the coupling. With space, or groove, 20 provided as described, the nut 2 partially collapses this space 20 by bending ring 22 forward. In fact, the walls of groove 20 can be pressed toward each other until they touch to an extent, dependent upon the degree of force applied in tightening the coupling.

The bottom of groove 20 is given a cross-sectional shape which will give precise direction, laterally and inwardly, to the shoulder-edge 16 as the groove 20 is collapsed and web 19 bowed. It is an object of the invention to apply the force of the collapsing web directly on the shoulder-edge 16. The force may be applied slightly to the left, or behind, the edge, but certainly not ahead of, or to the right. The object is to carry the edge directly down into the tube material as the collet is moved into abutment with the coupling body.

The bottom of groove 20 is given a V-shape directly over the edge-shoulder 16. The groove bottom may be given a radius with its low point over the edge. This radius will tend to produce the desired result. However, the direction of force will be most sharply defined by the V-shaped illustrated in the drawing.

NUT 2

Nut 2 threadedly engages threads 13 of body 1 with threads 23. As the threads engage, collet 3 is captured between the surfaces of body 1 and nut 2 for the deformation of collet 3 necessary to develop the sealing and holding structures with the tube which carry out the objects of the invention. The smallest bore of nut 2 is at 24, sized to accommodate the cylindrical surface 21 of collet 3. A counter bore 25 from the right of the nut is sized to readily accommodate ring 22 of collet 3. A beveled surface 26 is left between 24 and 25. This surface 26 becomes the actual contact surface which urges collet 3 upon the body 1 surfaces for the desired deformation.

OPERATION

FIG. 2 is established to illustrate the final form of the collet and tube in functioning to retain tube 4 and seal to it. Threads 13 and 23 are shown engaged, nut 2 and body 1 thereby drawn up, or tightened.

As sharp edges 15 and 16 have been carried down into the surface of tube 4 and along its length, they have skived abutments of tube material up in front of them at 15A and 16A. Evidence of the results of this action on the tube body is indicated by slight bulges on the inside of the tube wall.

In a general way, the forces applied to edges 15 and 16 have been described. These forces have as their source the torque applied to tighten nut 2 and body 1 to each other. This torque has moved nut 2 and body 1 toward each other. Surface 26 has applied its force against ring 22, moving surface 17 against surface 11. Edge 15 was deflected into the tube 4 surface to scrape up the tube material into abutment 15A. At the same time surface 26 began to collapse ring 22 into space 20. The web of collet material opposite groove 20 is bowed inwardly, carrying sharp edge 16 into the tube material to throw up abutment 16A.

Both abutment-forming functions are limited by the engagement of surfaces 12 and 18 and the engagement of the walls of groove 20. The large areas of 12 and 18 resist the torque applied to nut 2 and balance this force, applied through surface 26 and ring 22.

Completely made up, the coupling holds tube 4, gripped by its two abutments and sealed thereto, with great strength. However, this holding action has resiliency in that the partially collapsed walls of groove 20 leave a space which gives a degree of spring when hydraulic hammer, or other vibration, is applied to the tube held in the coupling, as well as the stress of thermal cycling. The shock absorption and thermal expansion offered by this structure, together with the support of collet extension 21 and limitation represented by surfaces 12 and 18 are among the many features of novelty in this coupling structure.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A tube coupling structure including:
    a body receiving a tube in its axial bore with substantially the external diameter of the tube it receives and having an internal abutting surface extending away from the bore of the coupling, the abutting surface comprising,
    a large flared surface at the entrance to the body bore,
    and a shoulder extended from the internal end of the flared surface to the bore which has a diameter substantially the same as the external diameter of the tube;
    a collet receiving the tube in its axial bore and having,
    a forward abutting surface mating with the body abutting surface to positively limit the movement of the collet into the body bore, the forward abutting surface comprising,
    a sharp leading edge portion sized to be directed by the body shoulder into the tube surface to develop an abutment of the tube material,
    and a surface extending back from the sharp leading edge which is shaped to match the flared surface of the body and develop sufficient friction between the two surfaces to prevent relative rotation between the collet and the body to keep torque applied to the collet from being transmitted to the tube and positively limit the direction of the sharp edge into the tube surface,
    an external groove formed intermediate the collet ends,
    and a sharp-edged step on the internal surface of the collet bore and opposite the collet groove;
    and a nut threadedly engaging the body to capture the collet between the body and nut and collapse the collet groove and thereby move the collet web inwardly to direct the sharp-edged step into the tube surface and develop an abutment of the tube material against which the step retains the tube in the coupling and seals to the tube and direct the sharp leading edge portion of the collet with the body surfaces and bring the mating surfaces of the body and collet together.

2. A three-piece, flareless, tube coupling including:
    a collet having,
    a leading edge arranged to be directed into the tube surface in a skiving action which throws up an abutment of tube material with which the leading edge retains the tube and seals the fluids into the tube,
    a groove intermediate the collet ends arranged to be collapsed by a force exerted parallel the tube axis so as to move the web of collet material below the groove into the tube surface,
    and a sharp-edged step shoulder on the internal surface of the web and opposite the groove which is carried into the tube surface in a skiving action which throws up an abutment of tube material with which the shoulder retains the tube and seals the fluids into the tube;

a body receiving the tube in its axial bore and providing a surface arranged to direct the leading edge of the collet into the tube surface in the skiving action;

a nut threadedly joined to the body to capture the collet between the body and nut in exerting the force parallel the tube axis which collapses the groove and carries the shoulder of the collet into the tube surface in the skiving action;

a large flared surface at the entrance to the body bore;

and an abutting surface on the collet mating with the flared surface of the body to positively limit the movement of the collet into the body bore, when the nut brings the surfaces together.

3. A tube coupling including:

a body receiving a tube in its axial bore having a large flared surface convex toward the entrance of the body bore, and a shoulder within the body bore extending inwardly from the internal end of the flared surface to a bore portion having a diameter substantially equal to the external diameter of the tube;

a collet about the tube and having, a sharp edge on the collet end moved toward the body shoulder and sized to be directed into the tube surface by the body shoulder to develop an abutment of the tube material, and an external surface of the collet extending back from the sharp edge which collet surface is shaped concave to mate with the convex flared surface of the body and develop the friction between the two surfaces which will prevent relative rotation between the body and collet and thereby avoid transmission of the torque which is applied to the collet being applied to the tube and positively limit the direction of the sharp edge into the tube surface;

an external groove formed intermediate the collet ends;

a sharp-edged step on the internal surface of the collet bore and opposite the collet groove;

and a nut threadedly joined to the body to capture the collet between the body and nut and direct the sharp edge of the collet with the body shoulder and bring the matching surfaces of the collet and body together and collapse the collet groove and thereby move the sharp-edged step into the tube surface and develop an abutment of the tube material against which the step retains the tube in the coupling and seals to the tube.

4. A three-piece, flareless, tube coupling including:

a collet having, a leading edge arranged to be directed into the tube surface in a skiving action which throws up an abutment of tube material with which the leading edge retains the tube and seals the fluids into the tube, a groove with a V-shaped cross-section intermediate the collet ends arranged to be collapsed by a force exerted parallel the tube axis so as to move the web of collet material below the groove transverse the tube axis and into the tube surface, and a sharp-edged step shoulder on the internal surface of the web and directly below the V-shaped groove so as to be carried into the tube surface in a skiving action which throws up an abutment of tube material with which the shoulder retains the tube and seals the fluids into the tube;

a body receiving the tube in its axial bore and providing a surface arranged to direct the leading edge of the collet into the tube surface in the skiving action;

a nut threadedly joined to the body to capture the collet between the body and nut in exerting the force parallel the tube axis which collapses the groove and carries the shoulder of the collet into the tube surface in the skiving action;

a large flared surface at the entrance to the body bore;

and an abutting surface on the collet mating with the flared surface of the body to positively limit the movement of the collet into the body bore, when the nut brings the surfaces together.

5. A three-piece, flareless, tube coupling including:

a collet having, a leading edge arranged to be directed into the tube surface in a skiving action which throws up an abutment of tube material with which the leading edge retains the tube and seals the fluids into the tube, a groove intermediate the collet ends arranged to be collapsed by a force exerted parallel the tube axis so as to move the web of collet material below the groove into the tube surface, and a sharp-edged step shoulder on the internal surface of the web and opposite the groove which is carried into the tube surface in a skiving action which throws up an abutment of tube material with which the shoulder retains the tube and seals the fluids into the tube;

a body receiving the tube in its axial bore and providing a surface arranged to direct the leading edge of the collet into the tube surface in the skiving action, the surface having the shape of a conical frustum which flares outwardly from the tube surface and toward the leading edge of the collet with a dimension lateral to the tube axis approximately 10 percent less than the lateral dimension of the front portion of the collet which carries the leading edge;

a nut threadedly joined to the body to capture the collet between the body and nut in exerting the force parallel the tube axis which collapses the groove and carries the shoulder of the collet into the tube surface in the skiving action;

a large flared surface at the entrance to the body bore;

and an abutting surface on the collet mating with the flared surface of the body to positively limit the movement of the collet into the body bore, when the nut brings the surfaces together.

6. A three-piece, flareless, tube coupling including:

a collet having, a leading edge arranged to be directed into the tube surface in a skiving action which throws up an abutment of tube material with which the leading edge retains the tube and seals the fluids into the tube, a groove intermediate the collet ends arranged to be collapsed by a force exerted parallel the tube axis so as to move the web of collet material below the groove into the tube surface, a sharp-edged step shoulder on the internal surface of the web and opposite the groove which is extended from relatively large cylindrical surfaces internal of the collet which are brought into full engagement with the tube surface as the shoulder is driven into the tube surface in a skiving action in order to set the limit of tube penetration by the shoulder and add to the seal the coupling makes with the tube, a body receiving the tube in its axial bore and providing a surface arranged to direct the leading edge of the collet into the tube surface in the skiving action;

a nut threadedly joined to the body to capture the collet between the body and nut in exerting the force parallel the tube axis which collapses the groove and carries the shoulder of the collet into the tube surface in the skiving action;

a large flared surface at the entrance to the body bore;

and an abutting surface on the collet mating with the flared surface of the body to positively limit the movement of the collet into the body bore, when the nut brings the surfaces together.

(References on following page)

References Cited in the file of this patent

UNITED STATES PATENTS

| | | |
|---|---|---|
| 1,143,816 | Duffy | June 22, 1915 |
| 1,307,540 | Dohner | June 24, 1919 |
| 1,489,065 | Clifton | Apr. 1, 1924 |
| 1,927,464 | McIntosh | Sept. 19, 1933 |
| 2,252,920 | Edelmann | Aug. 19, 1941 |
| 2,287,889 | Krumsiek | June 30, 1942 |
| 2,463,883 | Kinsey | Mar. 8, 1949 |
| 2,473,118 | Wolfram | June 14, 1949 |
| 2,473,119 | Wolfram | June 14, 1949 |
| 2,930,635 | Woodling | Mar. 29, 1960 |
| 2,934,362 | Frank | Apr. 26, 1960 |
| 3,055,684 | Currie | Sept. 25, 1962 |

FOREIGN PATENTS

| | | |
|---|---|---|
| 1,130,650 | France | Oct. 1, 1956 |
| 391,140 | Great Britain | Apr. 18, 1933 |